United States Patent [19]

Wolbers

[11] Patent Number: 4,986,936
[45] Date of Patent: Jan. 22, 1991

[54] VARNISH REMOVING COMPOSITION AND METHODS OF USING THE SAME

[76] Inventor: Richard C. Wolbers, Four Furness La., Wallingford, Pa. 19086

[21] Appl. No.: 208,341

[22] Filed: Jun. 17, 1988

[51] Int. Cl.$^5$ .................. C11D 3/20; C11D 10/02
[52] U.S. Cl. ............................ 252/170; 252/171; 252/173; 252/153; 252/542; 252/548; 252/174.24; 252/DIG. 8
[58] Field of Search ............... 252/170, 171, 542, 153, 252/548, 174.24, DIG. 8, 173

[56] References Cited

U.S. PATENT DOCUMENTS

| | | | |
|---|---|---|---|
| 1,036,946 | 8/1912 | Wilson | 252/DIG. 8 |
| 1,051,978 | 2/1913 | Alexander | 252/DIG. 8 |
| 1,113,971 | 10/1914 | Ellis | 252/DIG. 8 |
| 1,169,783 | 2/1916 | Ellis | 252/DIG. 8 |
| 1,618,867 | 2/1927 | Ellis | 252/DIG. 8 |
| 1,657,323 | 1/1928 | Simon | 252/DIG. 8 |
| 2,207,967 | 7/1940 | Bland | 252/DIG. 8 |
| 2,509,197 | 5/1950 | Borus | 252/DIG. 8 |
| 4,666,626 | 5/1987 | Francisco | 252/DIG. 8 |
| 4,732,695 | 3/1988 | Francisco | 252/170 |

*Primary Examiner*—Asok Pal
*Attorney, Agent, or Firm*—Panitch Schwarze Jacobs & Nadel

[57] ABSTRACT

A varnish removing aqueous solution comprises a first solvent comprising ketone, a second solvent selected from the group consisting of an aromatic compound, cyclohexanol, methyl cyclohexanol and pyridine, gelling agent and gelling agent activator selected from the group consisting of cationic surfactant, nonionic surfactant and simple organic base, in an aqueous solution. In addition, methods for removing varnish from varnish covered objects comprise applying the varnish removing composition to the surface of the varnish covered object to soften the varnish and removing the varnish and varnish removing composition from the object. Further, a method of removing varnish from a varnish covered object comprises applying the varnish removing composition in the manner described above, removing the varnish removing composition and a portion of the varnish from the object, applying an enzymatic-detergent gel to the surface of the object to soften at least a portion of any remaining varnish, and removing the varnish and gel from the object.

15 Claims, No Drawings

VARNISH REMOVING COMPOSITION AND METHODS OF USING THE SAME

BACKGROUND OF THE INVENTION

Field Of The Invention

1. The present invention relates to varnish removing compositions useful for removing varnish from varnish covered objects, particularly varnish covered artifacts.

2. Definitions

To enhance the understanding of the present invention, the definitions of terms used in the description and/or claims are set forth as follows:

As used herein, "varnish" will be understood to broadly include natural and synthetic clear and pigmented transparent or translucent protective coatings or resins where the underlying substrate is protected thereby and is visible therethrough. Also included are milk-based or casein-based (proteinaceous) coatings or painting materials which are typical of varnishes present on artifacts. Examples of a synthetic clear coating varnish which can be removed using the present invention include oil-modified or non-oil-modified polyurethanes. Examples of natural resin coatings include dammar or mastic, often compounded with glue or casein. The term "varnish," however, includes other clear and pigmented transparent or translucent coatings.

As used herein, "softening," as applied to varnish removal, will be understood to refer to at least partial dissolution of the varnish or solvation of the varnish. For example, varnishes generally have a hard, dry property. A varnish that is softened may appear to become wetted or swollen, or may simply be dissolved or solvated.

DESCRIPTION OF THE PRIOR ART

Varnish removal from wood, cloth (e.g.: canvas) and other surfaces traditionally comprises mechanical reduction of the varnish coating by, for example, sanding, shaving or brushing, and chemical reduction typically using harsh, volatile solvents. For example, typical solvents for oil-based and emulsion (latex) paints include methanol, methylene chloride and toluene. These solvents, however, are largely ineffective in removing older paints present on many antiques and artifacts, such as casein or milk-based paints. Typical solvents for clear coatings, include toluene, xylene, alcohol, mineral spirits (e.g.: turpentine), acetone and mixtures thereof.

Conventional solvents for paint and clear varnish are generally highly volatile, relatively toxic and are difficult to handle. Further, such solvents are often too harsh to use on delicate artifacts, such as paintings. The solvating activity of harsh solvents is difficult to control where, for example, it is desired to remove a layer of one type of varnish, which is over a layer of another type of varnish. Multi-layer and multi-type varnishes are typically present on paintings and other artifacts, especially those that are aged. Such solvents, alone or in combination, are generally ineffective in removing aged proteinaceous and oil-based varnishes.

Generally, solvents are used in their laboratory or reagent grade form, or may be mixed together when desired. In some cases, thickeners, such as methyl cellulose, are used to gel the solvents. Typically, however, the solvents remain volatile, causing eye and skin irritation and other systemic effects. In addition, certain mixtures, of such harsh solvents are not stable and are more highly toxic.

It would be desirable to have a varnish removing composition, which may be used to remove varnishes that is less harsh than conventional solvents, relatively easy to use and which minimizes volatility and toxicity.

SUMMARY OF THE INVENTION

According to the present invention, a varnish removing composition comprises a first solvent comprising a ketone, a second solvent selected from the group consisting of an aromatic compound, cyclohexanol, methyl cyclohexanol and pyridine, gelling agent and a gelling agent activator selected from the group consisting of cationic surfactant, nonionic surfactant and simple organic base, in an aqueous solution. The gelling agent is present in an amount of about 0.5% to about 2.0% by weight relative to the solvents, and the ratio of gelling agent activator to gelling agent is about 2.0:1 to about 50.0:1 by weight.

In addition, the present invention is directed to a method for removing varnish from a varnish covered object, which comprises applying the varnish removing composition described above to the surface of the varnish covered object for a time sufficient to soften the varnish, and removing the varnish and varnish removing composition from the object.

The present invention is further directed to a method of removing varnish from a varnish covered object, which comprises applying the varnish removing composition described above to the surface of the varnish covered object for a time sufficient to soften the varnish, removing the varnish removing composition and a portion of the varnish from the object, applying an enzymatic-detergent gel to the surface of the object for a time sufficient to soften at least a portion of any remaining varnish, and removing the varnish and gel from the object.

DETAILED DESCRIPTION OF THE PREFERRED EMBODIMENTS

According to the present invention, a varnish removing composition is capable of softening a varnish so that it can be removed from a varnish covered object. In accordance with the present invention, a varnish removing composition comprises a first solvent comprising a ketone, a second solvent selected from the group consisting of an aromatic compound, cyclohexanol, methyl cyclohexanol and pyridine, a gelling agent and a gelling agent activator selected from the group consisting of cationic surfactant, nonionic surfactant and simple organic base, in an aqueous solution. The first solvent specifically comprises ketone that is water miscible. Although it is not necessary that the ketone component of the aqueous ketone solvent exhibit total miscibility with water, it is preferred that the ketone exhibit at least partial miscibility with water in accordance with the present invention.

The ketone should also be capable of softening varnishes to which the composition is applied, in particular, clear varnishes, such as polyurethane, for example. Preferably, the ketone is polar and exhibits weak secondary bonding but is capable of hydrogen bonding. The ketone should not polymerize or copolymerize to or with the substrate beneath the varnish to be removed. Suitable ketones include acetone, 2-butanone (methyl ethyl ketone), cyclohexanone, methyl cyclohexanone, 4-methyl-2-pentanone, 3-pentanone (diethylketone) and 1-methyl-2-pyrrolidinone. More preferably, the ketone comprises acetone. One skilled in the art will appreciate, however, that other suitable ketones may be used in accordance with the present invention.

It is preferred that the ratio of ketone to water in the solvent solution is about 1:20 to about 10:1 by weight. It is presently preferred at the ratio of ketone to water is about 2:1 by weight, although higher and lower ratios may be used in accordance with the present invention.

The second solvent should be at least partially miscible in the aqueous ketone solvent solution. The second solvent should be capable of softening varnishes to which the composition is applied, in particular, pigmented varnishes, such as proteinaceous or alkyd resin, for example. Preferably, the second solvent exhibits low toxicity and should not polymerize or copolymerize to or with the substrate beneath the varnish to be removed. It is preferred that the second solvent comprises an aromatic compound suitable aromatic compounds include benzyl alcohol, phenol, 3-phenyl-1-propen-1-ol, 3-phenylpropanol, benzaldehyde, benzalkonium chloride, p-aminobenzoic acid, methyl-p-hydroxybenzoic acid, ethyl-p-hydroxybenzoic acid, benzonitrile, benzoyl chloride and nitrobenzene. It is presently most preferred that the aromatic compound is benzyl alcohol. One skilled in the art will appreciate, however, that other suitable aromatic compounds capable of softening varnishes may be used.

The ratio of first solvent and water to second solvent is preferably about 2:1 to 20:1 by weight. It is presently preferred that the ratio of first solvent and water to second solvent is about 7:1 by weight, although higher and lower ratios may be used in accordance with the present invention.

The varnish removing composition is gelled by a gelling agent. The gelling agent in accordance with the present invention should be capable of forming a gel or a colloid with the varnish removing composition without adversely affecting the solvency capacities of the components of the solvent solution. Further, the thickening efficiency of the gelling agent, its thickening uniformity and its ability to suspend insoluble particles should not be effected by the solvent solution.

A suitable gelling agent preferably comprises a water soluble polymer resin. It is presently preferred that the gelling agent comprises a polyacrylic acid. Such polyacrylic acids are manufactured by the B.F. Goodrich Speciality Polymers & Chemicals Division, and sold under the name Carbopol ®. Carbopol ® is a polyacrylic acid resin crosslinked with a polyalkenyl polyether and is sold as a fluffy, dry powder. In its cross-linked form, this gelling agent is a coiled or folded molecule. To activate or unfold the gelling agent, the cross-linked polyacrylic acid should be converted to its corresponding salt. This conversion or neutralization may be caused by the addition of a gelling agent activator.

The gelling agent is preferably present in the solvent solution in an amount sufficient to establish a varnish removing composition viscosity of about 10,000 to about 200,000 centipoises (cp) at 25° C. More preferably, the gelling agent is present in an amount sufficient to establish a viscosity of about 85,000 to about 100,000 cp at 25° C. The percent by weight of the gelling agent relative to the solvent solution necessary to achieve the preferred viscosity depends on the gelling or thickening properties of the particular gelling agent. For example, it is preferred that polyacrylic acid is present in an amount of about 0.5% to about 2.0% by weight relative to the solvent; more preferably, about 1.5% by weight relative to the solvent. One skilled in the art will appreciate, however, that greater and lesser concentrations of gelling agent may be used in accordance with the present invention and such concentration may be readily determined based upon the thickening properties of the particular gelling agent.

The gelling agent activator is preferably a cationic or nonionic surfactant, a simple organic base or mixtures thereof. Example of suitable cationic surfactants include polyethoxylated aliphatic amines, polyethoxylated quaternary ammonium salts, polyethoxylated aliphatic amides, fatty acid ethanolamides, dialkylolamides and fatty acid ethanolamines. Examples of suitable nonionic surfactants include polyethoxylated aryl or alkyl surfactants. Examples of suitable simple organic bases include isopropanolamine triethanolamine, monoethanolamine and diethanolamine.

More preferably, the gelling agent activator is a surfactant selected from the group consisting of polyoxyethylene(5)glycol cocoate, polyoxyethylene(15)glycol tallate, polyoxyethylene(5)cocoamine, polyoxyethylene(10)cocoamine, polyoxyethylene(15)cocoamine, polyoxyethylene(50)octadecylamine, polyoxyethylene(15)tallowamine, polyoxyethylene(10)soyaamine, polyoxyethylene(15)soyaamine, methylbis(2 hydroxyethyl)cocoammonium chloride, methylpolyoxyethylene(15)cocoammonium chloride, methylbis(2-hydroxyethyl)octadecylammonium chloride, methylpolyoxyethyl(I5)octadecylammonium chloride, methylbis(2)hydroxyethyl)oleylammonium chloride and methylpolyoxyethylene(15)oleylammonium chloride. It is presently preferred that the gelling agent activator is polyoxyethylene(15)cocoamine.

The gelling agent activator should be at least partially miscible in the varnish removing composition, preferably to a degree of miscibility similar to the miscibility of the gelling agent. Moreover the activator should not adversely affect the solvency capacities of the components of the solvent solution and should be readily able to unfold or neutralize the gelling agent in accordance with the present invention. Where the gelling agent is Carbopol ®, for example, the activator must be capable of breaking the cross-linkages, which results in the unfolding of the gelling agent. In addition, the activator should not react harshly with the varnish covered objects to which the varnish removing composition is to be applied. It is preferred that the activator is not highly reactive with oil-based or oil-cured varnishes. One skilled in the art will recognize that, in view of these qualities, other suitable gelling agent activators may be used in accordance with the present invention.

The activator should be present in an amount sufficient to neutralize or activate the gelling agent present in the solution. The ratio of surfactant to gelling agent is about 2.0:1 to about 50.0:1 by weight in accordance with the present invention. It is presently preferred where Carbopol ® is the gelling agent, for example, that the ratio of activator to gelling agent is about 2.5:1 by weight. One skilled in the art will recognize, however, that greater and lesser ratios of gelling agent activator to gelling agent may be used in accordance with the present invention largely dependent upon the properties of the gelling agent and the neutralizing capacity of the surfactant activator.

The varnish removing composition described above has a generally reduced volatility relative to conventional solvent solutions and is therefore less odoriferous and less irritating to use. Moreover, the gelled varnish removing composition provides a convenient carrier for softened or dissolved varnish, which may be readily removed from a varnish covered object. For example, while the inventor does not wish to be bound by any particular theory, it is believed that where, as in one embodiment of the present invention, gelling occurs when Carbopol ® is activated by polyoxyethylene(15-)cocoamine, a surfactant, the surfactant bonds to the Carbopol ® molecule. The free ends of the polyoxyethylene (the ends not bonded to the Carbopol ®) act to suspend the softened varnish in the varnish removing composition by wetting on to or dispersing the softened varnish. In addition, the gelled varnish removing composition is relatively easy to wipe off or remove from a varnish covered object.

It may be desired to add coloring or perfume ingredients to the varnish removing composition to enhance its cosmetic appearance and odor. Coloring and/or perfume ingredients should not, however, adversely affect the solvency capacities of the components of the solvent solution. The ingredients should also not adversely affect the gelling capacity of gelling agent or the gelling agent activating capacity of the activator. One skilled in the art will be readily able to determine any coloring and/or perfume ingredients desired to be added to the varnish removing composition in accordance with the present invention.

Further, according to the present invention, a method for removing varnish from a varnish covered object comprises applying the varnish removing composition described above to the surface of a varnish covered object. Examples of such varnish covered objects include paintings, furniture and other varnish covered woods. It is presently intended that the varnish coatings to be removed may comprise a variety of clear and pigmented synthetic or natural resins, glue or casein-based and milk-based resins, coatings, stains and paints. Examples of synthetic clear protective varnishes used for furniture and paintings which may be removed with the varnish removing composition include polyurethane and alkyd resin. In addition, it is intended that the varnish removing composition will not remove or will, relative to its action on natural and synthetic resins, only slowly remove oil-based or oil-cured coatings and paints. Further, it is presently intended that the varnish removing composition of the present invention will be particularly suited for conservation efforts in removing such synthetic or natural resin varnishes from antique furniture and paintings, such as, for example, removing polyurethane varnish from an oil painting while leaving the underlying oil paint substantially intact.

The varnish removing composition is applied to the surface of the varnish covered object for a time sufficient to soften the varnish. Generally, when the varnish removing composition is applied to the surface of the varnish covered object, the varnish becomes swollen or emulsified and/or is dissolved in the gelled varnish removing composition.

Once the varnish on the varnish covered object has softened, the varnish removing composition and the varnish are removed from the object. Where desired, the varnish removing composition may be applied again to the object to more fully remove the varnish therefrom. This may be desirable, for example, where the object is thickly covered with varnish or particularly resistant to the varnish removing composition.

It is generally preferred that the varnish removing composition is applied to a varnish covered object with an applicator. One skilled in the art will recognize that, especially where the varnish covered object is a delicate artifact or where the substrate of the varnish covered object is cloth or canvas, such as a painting, the varnish removing composition should be gently applied. A soft brush, soft cloth or a cotton swab are presently preferred as suitable applicators. Generally, the varnish and varnish removing composition are removed by wiping them off the surface of a varnish covered object with a cotton cloth or pad, for example.

In addition, a method of removing varnish from a varnish covered object comprises applying the varnish removing composition to the surface of the varnish covered object as described above and, after removing the varnish removing composition and a portion of the varnish from the object, applying to the surface of the varnish covered object an enzymatic-detergent gel. Such an enzymatic- o detergent gel is useful where the varnish to be removed is resistant and where removal may be furthered by enzymatic activity. In particular, the enzymatic-detergent gel may be used to remove oil-based or oil-cured coatings which are not generally removed by the varnish removing composition discussed above.

The enzymatic-detergent gel preferably comprises detergent, enzyme and thickener in an aqueous solution. The detergent is preferably a relatively mild detergent or surfactant. The detergent must not interfere with the enzymatic activity. Preferably, therefore, the detergent is a nonionic surfactant. Examples of such detergents include Triton-X TM-100, which is n-octyl phenol ethoxylate, Tween-20 TM and -80 TM, which are linear alkyl sorbitol ethoxylates, Brij-30 TM and -35 TM, which are linear alkyl polyethoxylates, and those nonionic surfactants comprising the gelling agent activator described above (all of which are available commercially).

Preferably, the detergent is present in an amount of about 0.01% to about 5.0% by weight relative to the aqueous solution. The amount of detergent largely depends on the surfactant activity of the particular detergent and the amount of detergent activity desired for a particular use. One skilled in the art may readily determine the amount of detergent in accordance with the present invention.

The enzyme is preferably lipase (commercially manufactured by Sigma Chemicals) or lipolase, a particularly resistant form of lipase (genetically engineered by Novo Chemical Company). More preferably, the enzyme in the enzymatic-detergent gel is lipase. One skilled in the biological arts will recognize that lipase generally has two sources: (1) mammalian cell extracts or derivatives and (2) bacterial or yeast extracts or derivatives. It is presently preferred that the lipase is a yeast derivative. An example of such a yeast derived lipase is the Type VII lipase manufactured by Sigma Chemicals Co. One skilled in the art will recognize, however, that other, similar lipase derivatives may be used in accordance with the present invention.

The amount of enzyme in the enzymatic-detergent gel is measured by enzyme activity, which is generally expressed as units/ml of solution. It is preferred that the enzyme is present in an amount of about 4,000 to about 9,000 units per milliliter of aqueous solution. In one embodiment of the present invention, for example, lg of enzyme having an activity of about 400–900 units/mg protein were added to 100ml of water. The resulting activity of the solution was about 4,000 to about 9,000 units/ml of solution.

The thickener in the enzymatic-detergent gel must not interfere with enzymatic activity. Accordingly, it is preferred that the thickener is neutral, that is, lacks significant ionic charge (nonionic) in solution. One example of such a thickener is hydroxypropylmethyl cellulose. One skilled in the art will appreciate, however, that other neutral thickeners may be used in accordance with the present invention. It is presently preferred that the thickener is present in an amount of about 1% to about 2% by weight relative the aqueous solution.

It is preferred that the aqueous solution of the enzymatic-detergent gel be maintained at a particular pH range so as to avoid denaturing the enzyme and providing a suitable environment for efficient enzymatic activity. In accordance with the present invention, the pH of the aqueous solution is preferably slightly alkaline (i.e., above about 7.0 pH). Where Type VII lipase is used as the enzymatic component, for example, the pH of the aqueous solution is preferably about 7.0 to about 8.5. More preferably the pH of the enzymatic-detergent gel is about 8.0 to about 8.5. It is presently preferred that the pH of the aqueous solution is about 8.4.

A buffer having a pK value suitable for maintaining the particular pH should be used. Examples of such buffers include sodium phosphate and tris(hydrochloric acid). While it is presently preferred that the buffer comprises tris(hydrochloric acid), one skilled in the art will recognize that other suitable buffers may be used in accordance with the present invention. The amount of buffer should be sufficient to maintain the desired pH of the enzymatic-detergent gel. One skilled in the art may readily determine the amount of buffer in accordance with the present invention.

The enzymatic-detergent gel is applied to the surface of the varnished covered object for a time sufficient to further soften the varnish. Several factors may determine the period of time sufficient for the varnish to be softened by the enzymatic-detergent gel, including the thickness of the varnish, the nature and age of the varnish and the temperature at which the enzymatic-detergent gel is applied. Once the varnish has been softened, the gel and at least a portion of the varnish are removed from the object by wiping them off with a soft cloth, for example.

It may be desirable where, for example, the varnish is particularly resistant and/or present in a relatively large amount, and where the varnish covered object will not be adversely affected, to rinse the object with mineral spirits, such as turpentine, or other aliphatic hydrocarbon solvents after removing the gel from the object. Examples of suitable aliphatic hydrocarbon solvents include Shel-Solv TM, Stoddards solvent, petroleum ether, benzine and mixtures thereof. One skilled in the art will recognize that other similar aliphatic hydyrocarbon solvents may be used in accordance with the present invention.

The invention will now be illustrated in further detail by reference to the following specific, non-limited examples.

EXAMPLE 1

A varnish removing composition in accordance with the present invention was prepared by mixing 200 ml of acetone (reagent grade, Fischer Scientific Inc.), 50 ml of benzyl alcohol (reagent grade, Fischer Scientific Inc.), and 25 ml of water using an air driven propeller. 8 ml of Ethomeen C-25 were added and mixed with this mixture. 1.5 gm of Carbopol ® 940 was added as a dry powder to the vortex of the mixture. Mixing continued until the consistency of the mixture was generally uniform. The final consistency and appearance of the mixture was a water-clear viscous gel which was sufficiently viscous so that when carried on a brush, the gel did not drip.

EXAMPLE 2

100 ml of deionized water, 0.664 gm of 0.05 M tris-HCl (8.4 pH) and 1.0 gm of Triton-X TM -100 were mixed in a flask equipped with a magnetic stirrer The solution was stirred until a clear solution was formed. 1.5 gm of hydroxypropylmethyl cellulose were added and stirred for about one hour until the cellulose was brought into solution, producing a viscous, clear gel-like consistency. 1.0 gm of lipase (Sigma Chemicals, Catalog No. L 1754, type VII, 400–900 units/mg protein, *Candida cylindracea* extract) was added to the stock mixture as a dry powder and stirred thoroughly. The mixture was then ready for immediate application to varnish covered objects.

EXAMPLE 3

A Piecrust Table, Accession No. 60.1061 from the Blackwell Parlor of the Winterthur Museum in Winterthur, Delaware comprised a top and base of true mahogany (Swietenia sp.) having surface coatings estimated to include natural resins, oil and polyurethane. Conservation Office personnel recalled refurbishing the table about ten to about fifteen years previously, after a water-spotting incident. The table had been stripped by solvent and mechanical reduction and recoated by first applying an oil stain as a toning layer and then applying multiple layers of "Zar", a polyurethane clear coating. The table top coating appeared very dark, greying or turbid in clarity and extremely thick in application. The color and pattern of the wiped-on oil stain appeared distinct from the natural wood color and grain underneath it. The oil/polyurethane coating appeared to extend across the surface of the table over the raised, carved border and spilled over the sides of the table top in an irregular drip-like fashion. A sample was taken for cross-sectional analysis.

The wood substrate (i) had a layer (ii), which appeared to be a natural resin/drying oil varnish layer (autofluoroscent, +rhodamine B [RHOB]) which extended into the wood substrate (i) to a depth of a few hundred microns. On top of layer (ii) was a layer (iii), which was a heavily pigmented, oil bound layer, (+RHOB), and which seemed to diffuse into the uppermost layer (iv). Layer (iv) (presumed to be polyurethane) was quite autofluorescent (blue/white), slightly positive for oil (speckled staining with Rhodamine) and had a glass-like, concoidal fracture in grinding. The conservation effort sought to remove layers (iii) and (iv) and leave the material of layer (ii) as intact as possible.

The varnish removing composition prepared in Example 1 was applied to the surface of the piecrust table. Within 1 to 2 minutes, the varnishing removing composition rapidly swelled and, in some areas, solvated the polyurethane coating (iv) and some of the oil stain of layer (iii). The varnish removing composition was wiped from the surface of the table top with a soft cotton pad. The enzymatic-detergent gel prepared in Example 2 was then applied with a soft brush to the surface of the table top. The enzymatic-detergent gel removed the residual urethane (iv) and oil stain residue (iii) in about 1 to 2 minutes. The enzymatic-detergent gel was removed from the surface of the table top, leaving an intact varnish layer (ii) wholly saturated into the substrate (i) as the recovered surface.

The present invention may be embodied in other specific forms without departing from the spirit or essential attributes thereof and, accordingly, reference should be made to the appended claims, rather than to the foregoing specification as indicating the scope of the invention.

I claim:

1. A varnish removing aqueous solution comprising a first ketone solvent, a second solvent selected from the group consisting of an aromatic compound, cyclohexanol, methyl cyclohexanol and pyridine, a gelling agent and a gelling agent activator selected from the group consisting of cationic surfactant, nonionic surfactant and simple organic base, the gelling agent being present in an amount of about 0.5% to about 2.0% by weight relative to the solvents, and the ratio of gelling agent activator to gelling agent being about 2.0:1 to about 50.0:1 by weight.

2. The solution according to claim 1, wherein the first solvent is selected from the group consisting of acetone, 2-butanone, cyclohexanone, methyl cyclohexanone, 4-methyl-2pentanone, 3-pentanone and 1-methyl-2pyrrolidinone.

3. The solution according to claim 1, wherein the aromatic compound is selected from the group consisting of benzyl alcohol, phenol, 3-phenyl-1-propen-1-ol, 3-phenylpropenal, benzaldehyde, benzalkonium chloride, p-amino benzoic acid, methyl-p-hydroxybenzoic acid, ethyl-p-hydroxybenzoic acid, benzonitrile, benzoyl chloride and nitrobenzene.

4. The solution according to claim 1, wherein the first solvent comprises acetone, the second solvent comprises benzyl alcohol, the balance of the aqueous solution comprising water.

5. The solution according to claim 4, wherein the ratio of acetone to water is about 1:20 to about 10:1 by weight.

6. The solution according to claim 5, wherein the ratio of acetone to water is about 2:1 by weight.

7. The solution according to claim 4, wherein the ratio of acetone and water to benzyl alcohol is about 2:1 to about 20:1 by weight.

8. The solution according to claim 7, wherein the ratio of acetone and water to benzyl alcohol is about 7:1 by weight.

9. The solution according to claim 1, wherein the gelling agent is a water soluble polymer resin.

10. The solution according to claim 9, wherein the polymer resin comprises polyacrylic acid.

11. The solution according to claim 10, wherein the gelling agent is present in an amount of about 1.5% by weight relative to the solvent.

12. The solution according to claim 1, wherein the gelling agent activator is selected from the group consisting of polyethoxylated fatty acids, polyethoxylated aliphatic amines, polyethoxylated quaternary ammonium salts, polyethoxylated aliphatic amides, fatty acid ethanolamides, dialkylolamides, fatty acid ethanolamines and triethanolamine, monoethanolamine, diethanolamine, isopropanolamine.

13. The solution according to claim 12, wherein the gelling agent activator is polyoxyethylene (15) cocoamine.

14. The solution according to claim 13, wherein the ratio of gelling agent activator to gelling agent is about 2.5:1 by weight.

15. The solution according to claim 1, comprising acetone and water having an acetone:water ratio of about 2:1 by weight, benzyl alcohol, having an acetone-water:benzyl alcohol ratio of about 7:1 by weight, polyacrylic acid present in an amount 1.5% by weigh relevant to the acetone, benzyl alcohol and water, and polyoxyethylene (15) cocoamine having a polyacrylic acid:polyoxyethylene (15) cocoamine ratio of about 2.5:1.

* * * * *